(12) United States Patent
Hett

(10) Patent No.: US 7,216,069 B2
(45) Date of Patent: May 8, 2007

(54) SIMULATED VISUAL GLIDESLOPE INDICATOR ON AIRCRAFT DISPLAY

(75) Inventor: Charles L. Hett, Lenexa, KS (US)

(73) Assignee: Honeywell International, Inc., Morristown, NJ (US)

( * ) Notice: Subject to any disclaimer, the term of this patent is extended or adjusted under 35 U.S.C. 154(b) by 852 days.

(21) Appl. No.: 10/052,716

(22) Filed: Jan. 17, 2002

(65) Prior Publication Data

US 2002/0099528 A1    Jul. 25, 2002

Related U.S. Application Data

(60) Provisional application No. 60/262,912, filed on Jan. 19, 2001.

(51) Int. Cl.
*G06G 7/72* (2006.01)
(52) U.S. Cl. .............................. 703/6; 703/8; 715/771; 701/14; 701/16; 434/38; 434/42; 340/976; 340/972
(58) Field of Classification Search .................... 703/3, 703/8; 715/771; 701/14, 16, 205; 434/38, 434/42; 340/976, 972
See application file for complete search history.

(56) References Cited

U.S. PATENT DOCUMENTS

| | | | |
|---|---|---|---|
| 3,939,571 A | 2/1976 | Studdard | |
| 4,210,930 A | 7/1980 | Henry | |
| 4,860,007 A | 8/1989 | Konicke et al. | |
| 5,361,212 A * | 11/1994 | Class et al. | 701/16 |
| 5,661,486 A * | 8/1997 | Faivre et al. | 342/33 |
| 5,745,054 A * | 4/1998 | Wilkens | 340/972 |
| 5,758,172 A | 5/1998 | Seo | |
| 6,094,185 A | 7/2000 | Shirriff | |
| 6,112,141 A * | 8/2000 | Briffe et al. | 701/14 |
| 6,216,064 B1 | 4/2001 | Johnson et al. | |
| 6,320,579 B1 | 11/2001 | Snyder et al. | |
| 6,711,479 B1 * | 3/2004 | Staggs | 701/16 |

OTHER PUBLICATIONS

Barrows et al., "Operational Experience with and Improvements to a Tunnel-in-the-Sky Display fro Light Aircraft" 1997, Stanford University, pp. 1-9.*

* cited by examiner

*Primary Examiner*—Paul Rodriguez
*Assistant Examiner*—Luke Osborne
(74) *Attorney, Agent, or Firm*—Fogg & Associates LLC

(57) ABSTRACT

An apparatus and method for simulating airport lighting aids by providing a generator having a processor structured to receive a plurality of navigation signals representative of position and altitude of a host aircraft; a signal generator operated by the processor, the generator being structured to retrieve airport information from a database as a function of the position signal, compare the position and altitude signals with a glide path, and output a signal representative of a degree of coincidence with the glide path as a function of the position and altitude signals; and a plurality of indicators structured to receive the signal output by the signal generator and responsively output a visual indication of the degree of coincidence with the glide path.

30 Claims, 5 Drawing Sheets

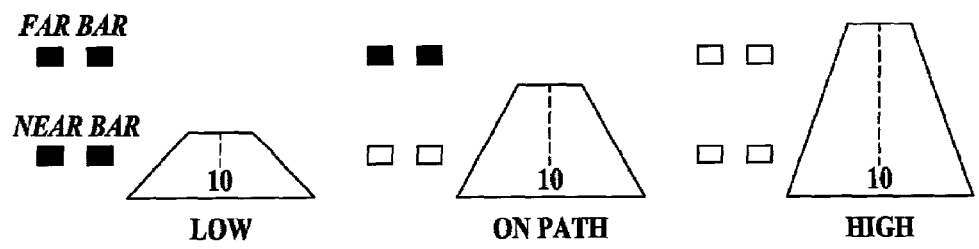
Fig. 1. (PRIOR ART)  ■ RED  □ WHITE
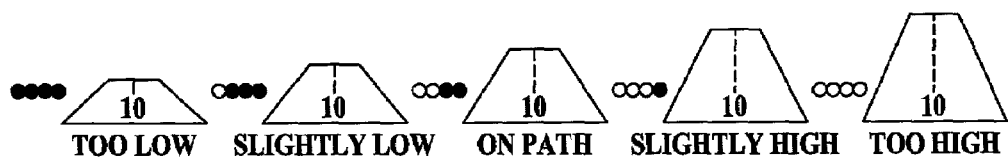
Fig. 2. (PRIOR ART)

SIMULATED VISUAL GLIDESLOPE INDICATOR ON AIRCRAFT DISPLAY

This application claims the benefit of U.S. Provisional Application Ser. No. 60/262,912, filed in the name of Charles L. Hett on Jan. 19, 2001, the complete disclosure of which is incorporated herein by reference.

FIELD OF THE INVENTION

The present invention relates to devices and methods for simulation of airport visual approach slope indicator, and in particular to a simulated airport lighting aid as displayed on a cockpit display.

BACKGROUND OF THE INVENTION

Aircraft landing at airports during marginal Visual Meteorological Conditions (VMC) or in cases of reduced cues such as night flight are aided by an Instrument Landing System (ILS). The ILS is a radio beam that originates on the ground at an ILS equipped airport and generates a glide slope that an aircraft can safely follow during an instrument approach to the runway. The ILS radio beam is detected by equipment onboard the aircraft and provides lateral, along-course, and vertical guidance to aircraft attempting to land at an ILS equipped airport. However, not all airport runways have an ILS generated radio glideslope.

Airports may substitute or also provide airport lighting aids as described in the Aeronautical Information Manual (AIM) for Basic Flight Information and ATC Procedures at Chapter 2: *AERONAUTICAL LIGHTING AND OTHER AIRPORT VISUAL AIDS* as published by the FAA (Federal Aviation Administration (U.S.)), which is incorporated herein by reference in its entirety. The airport lighting aids may provide vertical visual approach slope guidance to the runway, which is especially useful during marginal Visual Meteorological Conditions (VMC) or in cases of reduced cues. For example, various known Approach Light Systems (ALS) provide the basic means to transition from instrument flight to visual flight for landing. Operational requirements dictate the sophistication and configuration of the ALS for a particular runway. ALS are a directional pattern of high intensity signal lights starting at a landing threshold of the runway and extending a prescribed distance into the approach area. The signal lights shine upwardly toward the aircraft along the approach slope or glide path that guide the pilot visually during approach and landing. Some ALS include sequenced flashing lights which appear to the pilot as a ball of light traveling towards the runway at high speed. A number of precision and nonprecision configurations of ALS are known and illustrated in the AIM at Chapter 2. These known ALS and equivalents thereof are considered within the scope of the simulated airport lighting aid invention.

Another known airport lighting aid is the Precision Approach Path Indicator (PAPI) system, as described in the FAA's *AERONAUTICAL LIGHTING AND OTHER AIRPORT VISUAL AIDS* and in FAA Advisory Circular AC 150/5345-28D, dated May 23, 1985, incorporating Change 1, Subject: Precision Approach Path Indicator (PAPI) systems, which is incorporated in its entirety herein by reference. The PAPI uses a single row of either two or four light units. These systems have an effective visual range of about 5 miles during the day and up to 20 miles at night. The row of light units is normally installed on the left side of the runway as shown in FIGS. 1 and 2, in which the glide path indications are as depicted.

According to the PAPI system, either two or four identical light units are placed on one side of the runway in a line perpendicular to the runway centerline to define the visual glide path angle. The light units each have a white segment in an upper part of the beam and red segment in a lower part of the beam separated by a pink transition zone. In the two-light Type L-881 system shown in FIG. 1, the lights are positioned and aimed to produce a signal presentation wherein a pilot on or close to the established approach path (center) sees the light unit nearest the runway as red (shown as a darkened circle) and the other light unit as white (shown as white in a black circle). When above the approach path (right) the pilot sees both light units as white; and when below the approach path (left) the pilot sees both light units as red.

According to the four-light Type L-880 system PAPI system shown in FIG. 2, the signal presentation is such that a pilot on or close to the established approach path (center) sees the two light units nearest the runway as red and the two light units farthest from the runway as white. When above the approach path (center right) the pilot sees the light unit nearest the runway as red and the three light units farthest from the runway as white; and when further above the approach path (far right) the pilot sees all the light units as white. When below the approach path (center left) the pilot sees the three light units nearest the runway as red and the light unit farthest from the runway as white; and when further below the approach path (far left) the pilot sees all light units as red.

The visual glide path angle provided by the PAPI is the center of the center of the on-course zone, and is normally 3 degrees when measured from the horizontal, but may vary if jet aircraft are supported by the airport, if obstacles to flight are located at the airport, or if elevated terrain affects the approach to the airport. Other considerations in siting the PAPI indicator lights include whether the terrain drops off rapidly near the approach threshold, and whether severe turbulence is experienced on approach. On short runways, the PAPI indicator lights are located as near the threshold as possible to provide the maximum amount of runway for braking after landing. Thus, the PAPI indicator lights are positioned and aimed to produce a minimum Threshold Crossing Height (TCH), which is the height of the lowest on-course signal at a point directly above the intersection of the runway centerline and the threshold, and clearance over obstacles in the approach area.

FIG. 3 illustrates a known tri-color airport lighting aid system. Tri-color visual approach slope indicators normally consist of a single light unit projecting a three-color visual approach path into the final approach area of the runway. The below glide path indication is red, the above glide path indication is amber, and the on glide path indication is green. Tri-color visual approach slope indicators have a useful range of approximately one-half to one mile during the day and up to five miles at night depending upon the visibility conditions.

FIG. 4 illustrates a known pulsating airport lighting aid system in which the visual approach slope indicators normally consist of a single light unit projecting a two-color visual approach path into the final approach area of the runway. The on glide path indication is a steady white light. The slightly below glide path indication is a steady red light. If the aircraft descends further below the glide path, the red light starts to pulsate. The above glide path indication is a pulsating white light. The pulsating rate increases as the aircraft deviates further above or below the desired glide path. The useful range of the pulsating light system is about four miles during the day and up to ten miles at night.

FIG. 5 illustrates a Visual Approach Slope Indicator (VASI) system, as described in the FAA's *AERONAUTICAL LIGHTING AND OTHER AIRPORT VISUAL AIDS*, and in each of FAA Advisory Circulars AC 150/5340-25 dated Sep. 24, 1976, and AC 150/5345-28C dated Mar. 23, 1976, both incorporated in their entirety herein by reference. The VASI is another known airport lighting aid system that provides a visual glide path angle by directing a beam of light at approaching aircraft to indicate to the pilot whether the aircraft is within the appropriate glide path for approaching the intended runway. VASI lighting aid systems are visible from 3–5 miles during the day and up to 20 miles or more at night, and are arranged to provide visual descent guidance information during the approach after the aircraft is visually aligned with the runway. Lateral course guidance is provided independently by the runway or runway lights. As described in the FAA's *AERONAUTICAL LIGHTING AND OTHER AIRPORT VISUAL AIDS*, VASI installations are typically either 2, 4, 6 12, or 16, light units arranged in bars referred to as near, middle, and far bars. Most VASI installations are 2 bars, near and far, and may include 2, 4, or 12 light units, as described in U.S. Pat. No. 3,939,571, *METHOD AND APPARATUS FOR AIMING AIRCRAFT VISUAL APPROACH SLOPE INDICATOR*, which is incorporated in its entirety herein by reference. Two-bar VASI installations provide one visual glide path which is normally set at 3 degrees. Some VASI are three bars spaced intermittently along one or both sides of the runway, near, middle, and far, such as to provide an additional visual glide path to accommodate high cockpit aircraft. Three-bar VASI installations provide two visual glide paths. The lower glide path is provided by the near and middle bars and is normally set at 3 degrees while the upper glide path, provided by the middle and far bars, is normally ¼ degree higher. This higher glide path is intended for use only by high cockpit aircraft to provide a sufficient threshold crossing height or TCH. Although normal glide path angles are 3 degrees, angles at some locations may be steeper to give proper obstacle clearance. VASI installations having 2, 4, or 6 light units are located on one side of the runway, usually the left. Where the installation includes 12 or 16 light units, the units are usually located on both sides of the runway.

The basic principle of the VASI is that of color differentiation between red and white. Each light unit aims a narrow split beam of light at approaching aircraft. The lights each have a white segment in the upper part of the beam and red segment in the lower part of the beam with the transition zone being pink. The light units are arranged so that the pilot using the VASI during an approach sees the combination of lights shown in FIG. 5 for a 2-bar VASI (4 light units) system. The farthest light unit of a two unit system, for example, is aligned and positioned so that the bottom of the red or lower segment (shown as a darkened circle) is parallel to the glide path and forms the upper limit of an ideal glide path for the runway. In such a system, the light unit closest to approaching aircraft is aligned and positioned so that the top of the white or upper segment (shown as white in a black circle) is aimed into the glide path, and the bottom of the white segment is approximately parallel to the glide path and forms the lower limit of the ideal glide path. When an aircraft is on the proper glide path (center) the closest unit appears white to the pilot and the farthest appears red. If the approach is too high (right) both units are seen as white, and a low approach (left) is indicated by both units appearing red.

The PAPI and VASI airport lighting aid systems are controlled from the ground. However, as described in FAA Advisory Circular AC 150/5340-27A, dated Mar. 4, 1986, Subject: Air-to-Ground Control of Airport Lighting Systems, which is incorporated in its entirety herein by reference, radio control of airport lighting aids is available at selected airports to provide airborne control of lights by keying the aircraft's microphone. Control of lighting systems is often available at locations without specified hours for lighting and where there is no control tower or Flight Service Station (FSS) or when the tower or FSS is closed (locations with a part-time tower or FSS) or specified hours.

While airport lighting aids such as PAPI or VASI or another lighting aid are located at most airports, not all airports provide either an ILS radio glideslope or a visual glide path angle; approach safety is thereby degraded during marginal Visual Meteorological Conditions (VMC) or in cases of reduced cues such as night flight.

U.S. Pat. No. 4,210,930, APPROACH SYSTEM WITH SIMULATED DISPLAY OF RUNWAY LIGHTS AND GLIDE SLOPE INDICATOR, issued to Richard D. Henry on Jul. 1, 1980, attempts to provide simulated runway lights and Visual Approach Slope Indicator (VASI) for the pilot using an airborne image camera, its respective image scan plate and image Cathode Ray Tube (CRT) to form a display that portrays what the pilot would see, were it not for limited visibility conditions. The on-board CRT continuously enacts and displays, according to position of the aircraft, what would otherwise be visible to the pilot as the runway lights of an illuminated runway, were it not for obscured vision. This is obtainable by RF microwave signals from a plurality of from ground-based emitters at spaced locations along the length of a runway and at approximately the same locations as the runway lights thereon and reflectors which reflect the RF wave energy to the opposite ends of the runway. The RF emitters and reflectors substitute RF energy for visible spectrum light. The RF energy from the ground-based portion of the system is received and processed by instruments in the aircraft to create a display on the CRT.

While the ground-based RF system of providing simulated runway lights and Visual Approach Slope Indicator (VASI) may be useful in limited visibility conditions, the system requires that airports be equipped with additional equipment and energy sources along the runway with the aircraft using receptor equipment to detect the energy. Such a system fails to provide a simulated glideslope or visual glide path angle if not all airports are equipped with the RF emitters and reflectors.

SUMMARY OF THE INVENTION

The present invention provides an apparatus and method that provides a simulation of Precision Approach Path Indicator (PAPI) or Visual Approach Slope Indicator (VASI) or another airport lighting aid on the cockpit display independent of the visibility conditions.

According to one aspect of the invention, a glide path simulation generator is provided having a means for receiving a plurality of navigation signals; a means for retrieving airport information from a database as a function of one or more of the navigation signals; a means for determining deviation from a glide path as a function of one or more of the navigation signals and one or more of the airport information; and a means for outputting a signal representative of the deviation from the glide path. The glide path simulation generator may further include a means for visually displaying the deviation from the glide path as a function of the deviation signal. Additionally, the displaying means may further include means for displaying the deviation substantially conformally with a target runway as seen from a host aircraft cockpit. The generator's displaying means may further include means for displaying information as to the degree of the deviation from the glide path as a function of the deviation signal. According to other aspects of the invention, the generator's means for determining deviation from a glide path may further include either means for generating the glide path, or means for retrieving the glide path from the database of airport information as a function of one or more of the navigation signals. The generator of the invention also includes a means for updating the deviation over time.

According to another aspect of the invention, the simulated airport lighting aid generator is embodied as a processor structured to receive a plurality of navigation signals representative of position and altitude of a host aircraft; a signal generator operated by the processor, the generator being structured to retrieve airport information from a database as a function of the position signal, compare the position and altitude signals with a glide path, and output a signal representative of a degree of coincidence with the glide path as a function of the position and altitude signals; and a plurality of indicators structured to receive the signal output by the signal generator and responsively output a visual indication of the degree of coincidence with the glide path. According to one aspect of the invention, the glide path portion of the generator of the invention may be one of the airport information retrieved from the database. According to another aspect of the invention, the glide path portion of the generator of the invention is a glide path generated by the signal generator as a function of the position signal and a portion of the airport information retrieved from the database.

According to various other aspects of the generator of the invention, the indicators further include illuminated indicators positioned on a cockpit display, such as a Primary Flight Display (PFD) or a Head-Up Display, and the illuminated indicators are presented conformally, i.e., positioned on the display to appear in positions consistent with ground-based airport lighting aids as seen on approach. Furthermore, the indicators may further include a pointer indicator programmed to provide information as to an amount of change in altitude to increase the degree of coincidence with the glide path. The pointer indicator may be presented so as to simulate a traditional vertical deviation scale.

According to still other aspects of the invention, the invention provides a computer program product for indicating deviation from a glide path, wherein the computer program product includes a computer-readable storage medium; and computer-readable program code means embodied in the medium, the computer-readable program code means having: a first computer-readable program code means for determining a global position from a received plurality of navigation data, a second computer-readable program code means for determining an altitude above ground level from one or more received navigation datum, a third computer-readable program code means for retrieving a plurality of airport information from a database of airport information as a function of the position determined from the first computer-readable program code means, a fourth computer-readable program code means for determining coincidence between the position determined from the first computer-readable program code means combined with the altitude determined from the second computer-readable program code means and a glide path determined as a function of the airport information determined from the first computer-readable program code means, and a fifth computer-readable program code means for outputting a signal as a function of the coincidence determined from the fourth computer-readable program code means. The computer program product of the invention may include a sixth computer-readable program code means for interpreting the signal output by the fifth computer-readable program code means as a pattern of illuminated indicators on a cockpit display.

According to one aspect of the invention, the fourth computer-readable program code means of the computer program product may further include means for computing the glide path as a function of the airport information. The fourth computer-readable program code means may alternatively include computer-readable program code means for retrieving the glide path as one of the plurality of airport information retrieved from the database of airport information.

According to another aspect of the invention, the pattern of illuminated indicators provided by the computer program product simulates a known airport lighting aid such as a Visual Approach Slope Indicator. Preferably, the simulated airport lighting aid provides a substantially conformal presentation.

According to still other aspects of the invention, a method is provided for using an electronic circuit to compare a signal conveying navigation data with a predetermined glide path, the method including: receiving a plurality of navigation signals; retrieving airport information from a database as a function of one or more of the navigation signals; determining deviation from a glide path as a function of one or more of the navigation signals and one or more of the airport information; and outputting a signal representative of the deviation from the glide path.

According to one aspect of the invention, the method may further include visually displaying the deviation from the glide path as a function of the deviation signal. The method preferably includes updating the deviation over time by, for example, repeating the determining of the deviation from the glide path at predetermined intervals.

According to another aspect of the invention, the portion of the method for determining the deviation from a glide path may further include either generating the glide path as a function of the airport information retrieved from the database, or retrieving the glide path from the database as function of one or more of the navigation signals.

According to another aspect of the invention, the portion of the method for displaying the deviation may further include displaying the deviation as a substantially conformal presentation on a cockpit display. According to still another aspect of the invention, the portion of the method for displaying the deviation may also include displaying information as to a degree of deviation using, for example, a pointer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 1 and 2 illustrate two and four light versions, respectively, of the airport visual approach lighting aid known as a Precision Approach Path Indicator (PAPI) system;

DETAILED DESCRIPTION OF PREFERRED EMBODIMENT

In the Figures, like numerals indicate like elements.

The present invention is an apparatus and method for generating and displaying a simulated visual glide path indicator. The apparatus includes a memory having stored therein a database of airport information, including runway location, elevation and direction information, accessible as a function of position; a processor coupled to receive position and elevation data and coupled to the memory for retrieving the airport information as a function of the position, the processor being structured to operate a computer program for generating a glide path, comparing the position and elevation data to the glide path, and generating a signal representative of deviation of the combined position and elevation data from the glide path; and a cockpit display being coupled to receive the deviation signal and being structured to illuminate a pattern of indicators as a function of the deviation signal. According to different embodiments of the invention, the illuminated pattern of indicators simulates any one of the known airport lighting aids as described in the Aeronautical Information Manual (AIM) for Basic Flight Information and ATC Procedures at Chapter 2: *AERONAUTICAL LIGHTING AND OTHER AIRPORT VISUAL AIDS* as published by the FAA, including for example, the PAPI and VASI airport lighting aids. The signal representative of deviation of the position and elevation data from the glide path as generated by the apparatus and method of the invention may also include a pointer portion that is programmed to simulate a vertical deviation scale.

Figure 6:
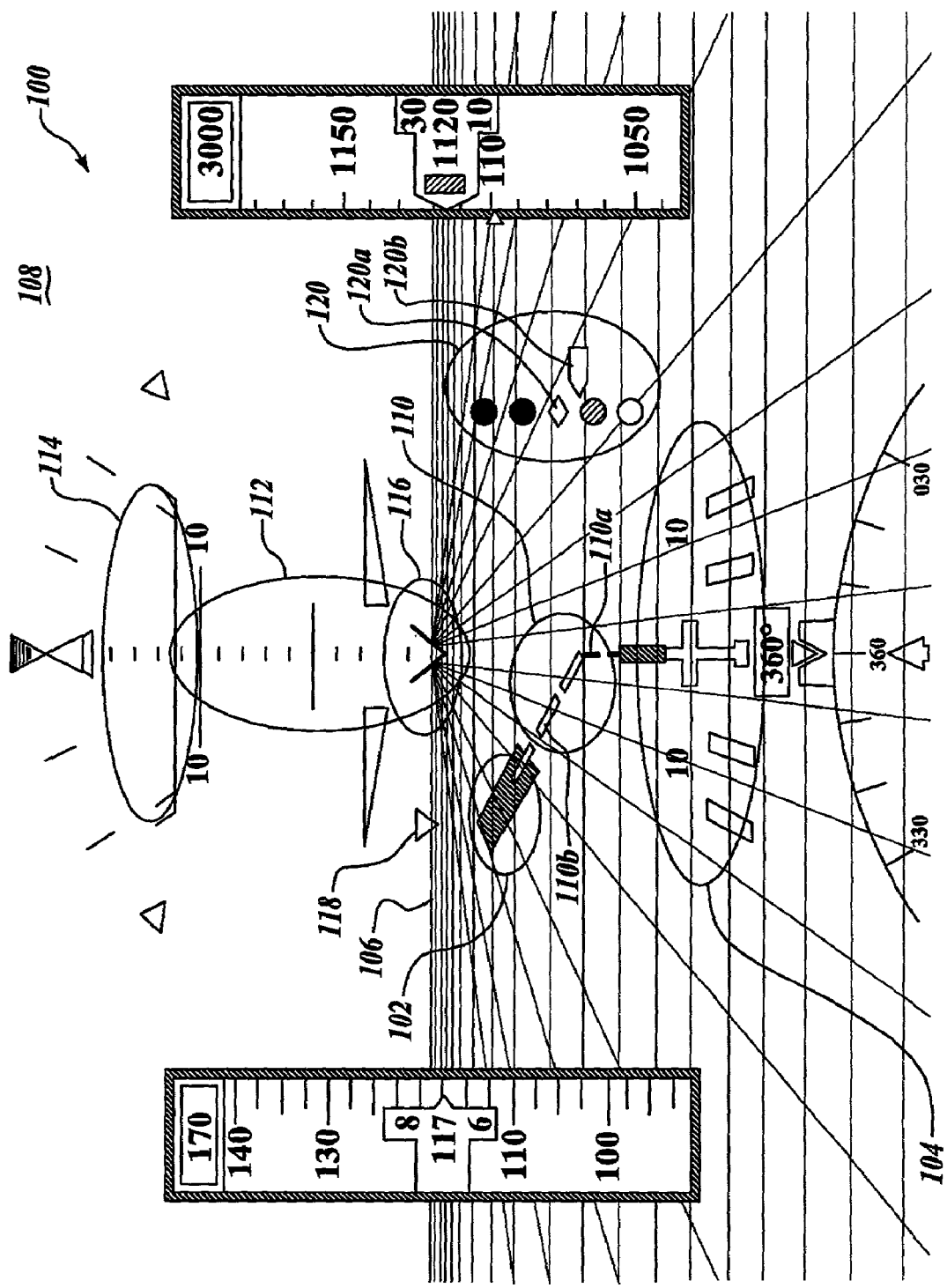
FIG. 6 illustrates a Head Up Display (HUD) that includes the simulated visual glide path indicator of the invention.

FIG. 6 illustrates an aircraft cockpit display 100, for example, either a Primary Flight Display (PFD) or a Head Up Display (HUD), that includes the simulated visual glideslope indicator display of the invention. The HUD is, for example, the HUD2020 provided by Honeywell International, Inc. of Morristown, N.J. However, the HUD2020 is only one example used to demonstrate the invention and is not intended in any way to limit the scope of the invention. A suitable PFD is the Honeywell DU-1080 Display Unit, which is a color active matrix liquid crystal display based device 10.4" diagonal in size also available from Honeywell International, Inc. Of course, many other displays are also suitable for practicing the invention.

The display 100 includes a number of features that are briefly explained to provide context for the simulated visual glide path indicator display of the invention. In FIG. 6 a conformal runway/airport symbol 102 is provided on the display 100. In other words, the symbol 102 is sized and positioned on the display 100 such that its image overlays the actual airport as seen from the pilot's position; the images displayed by the display 100 thus conform to actual features on the ground as seen on approach from the aircraft's cockpit. The conformal display 100 assists with subconscious pre-attentive referencing and bypasses conscious decision making. The conformal display 100 has been shown to reduce pilot workload while improving pilot tracking performance.

The airport portion of the symbol 102 is used when the aircraft is above about 1,000 feet above ground level (AGL) because the airport's relative size makes it visible. As the aircraft approaches the ground, the runway portion of the symbol 102 appears, and the airport portion is removed from the display. The conformal runway/airport symbol 102 is constructed using horizontal and longitudinal line segments to appear conformal to a flat surface on the ground. The longitudinal line segments terminate at fixed depression angles which determine Y coordinates for the line end points. X coordinate end points of the longitudinal lines are based on a quantity commonly referred to as "inverse slope." If the longitudinal lines were extended, the end points would theoretically extend to a common vanishing point on the horizon and to a point directly below the aircraft.

When in range a pilot begins looking for the airport. During marginal VMC or in cases of reduced cues such as night flight, the airport may not be visible. Thus, the airport is presented on the display 100 to replicate cues basic to visual flight. The airport cue 102 is presented at a display point of the display 100 in its perceived position in depth. Such conformal presentation of symbology effects pre-attentive referencing, which is a recognition driven process that reduces pilot workload, rather than requiring conscious decision. Such pre-attentive referencing is desirable because pilot workload scores are high and continue to climb as the pilot gets closer to landing. Some displays may operate differently by, for example, removing some of the ambiguity of objects in the far domain (external world) that exist in Instrument Meteorological Conditions (IMC) by presenting them in the near domain (displays).

A conformal lateral deviation display 104 is presented on the display 100 and includes a conformal deviation centerline and conformal lateral deviation scale, which together are referred to as the conformal lateral deviation display 104. The conformal lateral deviation display represents the desired course and course deviation along the ground. Similar to the runway/airport symbol 102, the conformal lateral deviation display 104 is constructed to appear conformal to a flat surface on the ground. Traditional deviation indicators indicate deviation from desired course on a fixed width scale where each dot (not shown) or trapezoid (shown) of deflection represents a predetermined degree off-course. Because the scale is presented as being at a distance below the aircraft, the scaling or distance between trapezoids varies as a function of the estimated distance above ground.

As the aircraft approaches closer to the airport and closer to the ground, path deviation becomes more critical. The deviation indicators thus become larger closer to the ground. The perspective view of the trapezoids is also beneficial in recognizing distance to the airport. As with the conformal runway/airport symbol 102, the conformal lateral deviation display 104 assists with subconscious pre-attentive referencing. In addition to reducing workload, the conformal lateral deviation display 104 has been shown to improve pilot tracking performance.

The display 100 also presents texturing and perspective lines 106 on the ground and color gradations (not shown) on both ground (using shades of brown) and sky 108 (using shades of blue). Horizontal and longitudinal perspective line segments 106 are superimposed on the ground, which is appropriately colored, for example, brown. The longitudinal lines are extended to a common vanishing point on the horizon. A random texture (not shown) may be superimposed on top of the brown ground to further enhance perception.

During VMC, pilots perceive movement and distance by combining evidence about texture, perspective, and color changes. These same immergent features, i.e., texture, perspective, and color, are recreated and integrated in the display 100 display. The display 100 thus reproduces an "optical flow," a momentary velocity of texture and/or grids across the visual field that the pilot perceives close to the ground. Color gradations are presented in the sky 108 that replicate color gradations on a clear blue day and facilitate pre-attentive processing for depth perception as well as indications for unusual attitude recovery. Perspective lines 106 are presented to assist depth perception. This integrated picture of texture, perspective, and color cues assists situation awareness by modeling on the display an internalized mental model of current and projected state of the flight environment.

Conformal lateral path indicators 110 are presented to indicate a colored path to the current and next waypoint. The conformal lateral path indicators 110 are constructed to appear conformal to a flat surface on the ground. The path indicator 110a to the current waypoint is colored differently from path indicator 110b to the next waypoint. The current path indicator 110a is a solid line, the next path indicator 110b is a dashed line. The conformal lateral path indicators 110a, 110b and the differences between them improve situational awareness (SA), which can be defined as perception of elements in the environment within a volume of time and space and the projection of their status in the near future. As new technologies and automation have been introduced to the cockpit, pilots report SA is lacking. Support of the tactical SA on the tactical display is important, where the primary flight display (PFD) is the tactical display and the navigation (NAV) display is the strategic display. The basic tactical SA needs are "Where am I?" and "Where am I going?" The conformal lateral path indicators 110 provide this tactical SA enhancement with current and next paths 110a, 110b on the PFD, which is the display compatible with tactical flight. The use of conformal symbology to indicate the path also provides visual momentum to the pilot, whereby she/he can see how one picture (the inside HUD 100 display) relates to another picture (the real world). Visual momentum reduces cognitive overhead in the translation of one display to the next, and thereby reduces overall workload.

The display 100 may include expanded lateral and vertical horizons and a conformal pitch scale or tape shown at 112. The pitch tape and horizon at 112 display a conformal attitude using, for example, 1 degree on the display as being equivalent to 1 degree on the window. The pitch tape uses solid colored (light blue) ticks for positive pitch and differently colored (brown) ticks for negative pitch. Additionally, light blue colored ticks appear on the horizon line at every 10 degrees.

The ball/attitude indicator 112 is as large as the display 100 permits. Larger displays permit a pilot to more easily discriminate upsets to pitch by increasing peripheral field of view. The quicker a pilot can detect a disturbance, the quicker a corrective action can be made, and therefore, overall performance, i.e., on track, on altitude, on speed, is improved. Additionally, overall workload is reduced because the quicker the pilot catches a problem, the quicker it can be resolved so that less cognitive and physical exertion is required to maintain course. Safety is also improved. In the example of windshear, if a pilot detects it early, e.g., by disturbance to intended attitude and path, an unrecoverable condition is less likely to occur. The use of conformal symbology thus provides visual momentum to out-the-window-view.

A conformal pitch limit indicator (PLI) 114 provides visual cues to the approach of stall conditions. The PLI 114 is positioned conformally about the pitch ladder on the center of the display and operates at the same attitude that a stick shaker, if present, would start to shake. Spatial disorientation occurs when a pilot is deprived of visual references to determine the aircraft's orientation in space. A stall/spin or a stall/mush may be a fatal result if directional control is lost because the pilot is not aware of the bounds of pitch. Around one half of general aviation (GA) accidents are attributable to lost control or the stall/spin/mush condition. The conformal PLI 114 is a very salient cue and dramatically increases awareness of approach to stall condition, and thus enhances safety.

During VMC, pilots often use landmarks, e.g., a mountain peak, on the horizon as a guide to a destination. These visual landmarks provide situation awareness. When flying IMC, these landmarks are not available. The display 100 thus provides conformal a lateral conformal current waypoint 116 represented as a colored triangle on the horizon. The lateral conformal current waypoint cue 116 replicates an element common to visual flight, thereby increasing SA by contributing to visual momentum.

A conformal next waypoint 118 is presented on the display 100 represented as a smaller, differently colored triangle on the horizon. As mentioned, SA can be defined as the perception of elements in the environment within a volume of time and space and the projection of their status in the near future. Current and next waypoints 116, 118 provide tactical situation awareness.

Figure 3:
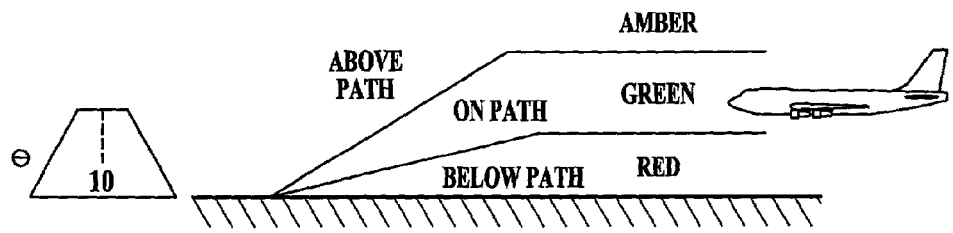
FIG. 3 illustrates a tri-color visual approach slope indicator system in which different colored lighting aids indicate deviations from the ideal glide path.
Figure 4:
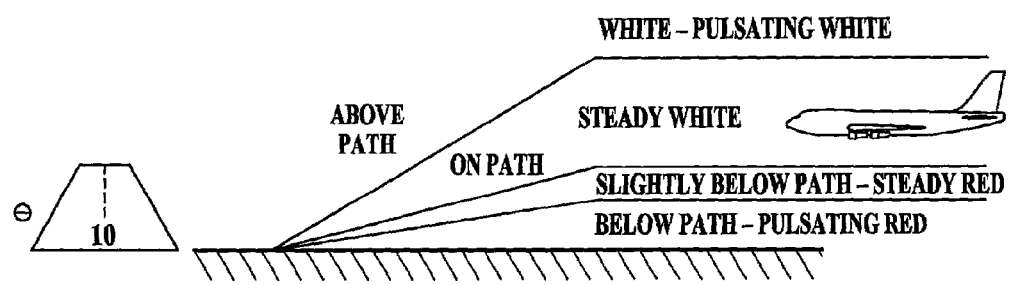
FIG. 4 illustrates a pulsating visual approach slope indicator system in which the indicator lights pulse faster for greater deviations from the ideal glide path.
Figure 5:
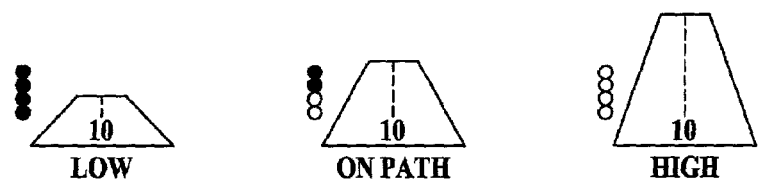
FIG. 5 illustrates the airport visual approach lighting aid known as a Visual Approach Slope Indicator (VASI) system.

According to the invention, a simulated visual glide path indicator 120 is provided on the display 100 aircraft display simulating an airport lighting aid. In the example shown in FIG. 6, the airport lighting aid simulated is a Visual Approach Slope Indicator (VASI) system, which is available at most airports. However, the invention may be practiced using any of the current or future airport lighting aid systems, including the precision & non-precision ALS configurations shown in above-incorporated *AERONAUTICAL LIGHTING AND OTHER AIRPORT VISUAL AIDS* as published by the FAA, one example of which is illustrated in FIG. 1. Alternatively, the invention is practiced using one of the PAPI two-light Type L-881 and four-light Type L-880 system shown in FIGS. 1 and 2, respectively; or either the tri-color visual approach slope indicators illustrated in FIG. 3, or the pulsating two-color visual approach slope indicators illustrated in FIG. 4.

As discussed above, VASI systems provide vertical visual approach slope guidance to an airport runway, which is especially useful during VMC or in cases of reduced visual cues. VASI systems radiate a directional pattern of high intensity red and white colored lights. On the glide path the pilot sees red over white. Above path, the pilot sees white over white, and below path the pilot sees red over red. However, the VASI system also includes color transition between visible lights. Accordingly, the VASI example of simulated visual glide path indicator 120 illustrated in FIG. 6 includes two red colored (darkened) indicator lights over an upper white indicator light turning to a pink color (shaded) indicator and a lower white colored (white) indicator light. This configuration indicates slightly below path.

FAA regulations may require the normally red-colored indicators 120 to be another color that is not normally associated with immediate hazard to the safety of the aircraft. Therefore, when the invention would cause one or more of the indicators 120 to be red-colored as a function of the aircraft's position relative to the ideal glide path, the invention is practiced using another color that is both sufficiently different from red to be permitted by FAA regulations and sufficiently different from white to be easily and quickly distinguishable so that pilot workload is minimized.

The invention also provides an ideal glide path target 120a between the upper and lower pairs of indicator lights. For example, a white or other colored diamond (shown) or other shaped ideal glide path target 120a indicates the ideal glide path. The simulated VASI 120 thus provides a qualitative indication of the aircraft's deviation above or below the ideal glide path. The simulated visual glide path indicator 120 of the invention is thus enhanced by inclusion of a more precise display, a needle or pointer indicator 120b, that is programmed to simulate a traditional vertical deviation scale, and thereby provide additional information as to the degree of deviation. The pointer portion 120b of the simulated visual glide path indicator 120 thus indicates to the pilot the amount and direction of change in altitude, either higher or lower, to increase the degree of coincidence with the glide path. As with a conventional VASI system, the VASI example of simulated visual glide path indicator 120 includes two red colored indicator lights over two lower white colored indicator lights when the aircraft is on the ideal glide path or within an acceptable deviation above or below.

The simulated visual glide path indicator 120 thus provides the pilot additional color coding information that is consistent with the information provided by a conventional airport lighting aid during a VMC approach. The simulated visual glide path indicator 120 displays familiar symbology, such as the VASI symbology (illustrated) or another common symbology, that facilitates basic, simple, perceptual judgments, e.g., am I high, or am I low. The color coding simulated visual glide path indicator 120 provides pre-attentive context. For example, in the example illustrated in FIG. 6, the color configuration displayed by the simulated visual glide path indicator 120 informs the pilot of a slightly below path condition. The pilot then further interrogates the display, i.e., looks at the displacement of the needle 120b from center, or the ideal glide path target 120a, if available, to determine degree of corrective action required to reacquire the ideal glide path. Pilot response time is quicker because of the pre-attentive information that the color coding provides.

Figure 7:
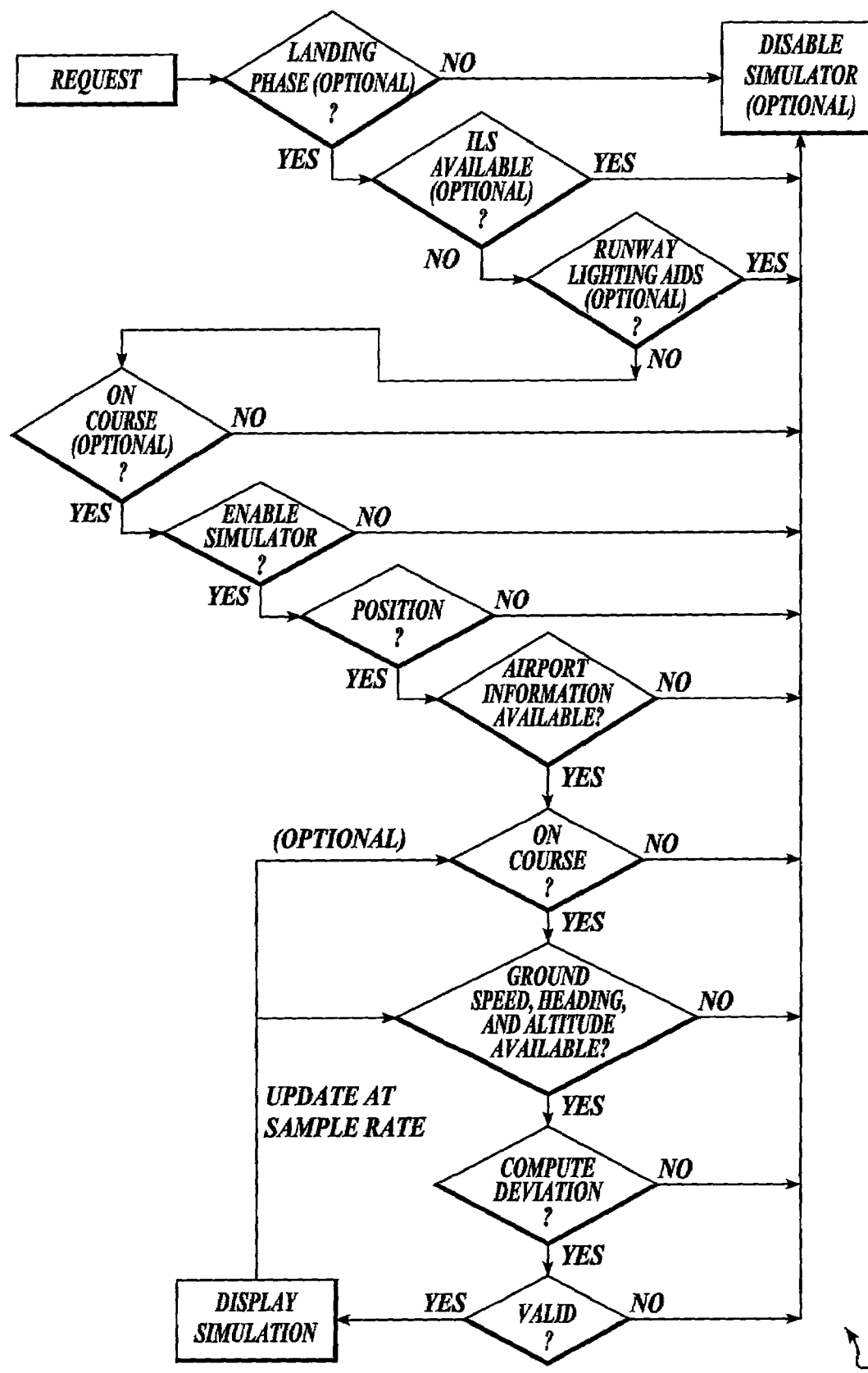
FIG. 7 illustrates one example of a method for practicing the simulated visual glide path indicator of the invention embodied in a flowchart.

FIG. 7 illustrates one example of the simulated visual glide path indicator 120 of the invention embodied in a flowchart 200. Accordingly, a request for display of the simulated visual glide path indicator 120 of the invention is received, either from the pilot of an aircraft on approach to an airport, or from a Flight Management System (FMS) onboard the approaching aircraft as a function of the location and phase of flight. The request stimulates the simulated visual glide path indicator 120 of the invention to enquire as to the current phase of flight, and whether the airport is provided with either an ILS or an airport lighting aid. Phase of flight is provided, for example, by the sensed positions of the flaps and landing gear. If available, on- and off-course information may also be interrogated and used to respectively enable and disable the simulated visual glide path indicator 120 so that SA is not compromised by misleading information. Presence of an ILS or airport lighting aid is provided, for example, by reference to an onboard data base including the information, or by direct detection using known sensors. Presence of either an ILS or an airport lighting aid may be used to disable the simulated visual glide path indicator 120. However, ground-based airport lighting aids are known to have practical limitations, especially during inclement weather, but are useful for providing SA even when ILS is available. Therefore, the simulated visual glide path indicator 120 may be engaged even when either ILS or ground-based airport lighting aids are available.

Once enabled, the simulated visual glide path indicator 120 imports position information, for example, from an onboard Global Positioning System (GPS) receiver, although such position information could be determined from another source. The position information is used to retrieve information about the airport layout, including runway position and direction. Alternatively, the flight plan is retrieved from the onboard FMS and is used to retrieve the relevant airport information. Information about local terrain data and obstacles to flight are retrieved, if available, for use in producing the required TCH for clearance over obstacles in the approach area. Such information may be available, for example, by reference to an airport information database stored in an onboard memory. The airport information may be alternatively available by reference via radio to a database stored in a ground-based memory. Navigation information, i.e., heading, elevation, current position and ground speed information, are retrieved from an onboard navigation instrument, such as the GPS receiver. However, ground speed may be a derived value computed as a function of samples of the navigation information compared relative to elapsed time between samples.

The navigation information are combined with the runway position and direction information to generate a safe glide path into the airport, the safe glide path including an acceptable range of deviation above and below an ideal glide path. The ideal glide path and the acceptable range of deviation may be either computed directly or, if available, retrieved from an onboard database of airport information. The local terrain and obstacle data are used to produce a TCH, which is used to modify the minimum glide path. The local terrain and obstacle data may also be used to increase the glide path from the typical 3 degree angle. The simulated visual glide path indicators 120 may also consult preset aircraft type data and responsively increase the glide path angle for jet aircraft. Alternatively, the minimum glide path angle for the host aircraft is preset using a program pin.

The aircraft's current position and altitude are compared to the computed or retrieved ideal glide path, and a deviation above or below is determined. A signal is generated that is representative of the degree of deviation from the ideal glide path. The deviation signal is output to the cockpit display 100, which outputs a visual indication of the degree of deviation. Simulated visual glide path indicators 120 are displayed on the cockpit display 100, for example, in a format similar to the VASI, PAPI or another airport lighting aid. When the display 100 is a conformal display, the simulated visual glide path indicators 120 are displayed at approximately the position where ground-based VASI, PAPI or other airport lighting aid, if available, would be visible from the cockpit. The glide path indicators 120 thus conform to the runway as viewed from the aircraft's cockpit. Alternatively, the simulated visual glide path indicators 120 are displayed at fixed location relative to the display 100. The simulated visual glide path indicators 120 and ideal glide path target 120a are displayed as a function of the aircraft's current deviation from (or coincidence with) the ideal glide path, with the indicator lights showing red, pink and white as appropriate. Furthermore, the needle portion 120b of the display provides a more precise indication of the degree of corrective action required to acquire or reacquire the ideal glide path. The display of simulated visual glide path indicators 120 is updated at intervals as a function of the aircraft's position and altitude relative to the computed glide path. The navigation information is updated at a predetermined sample rate selected such that the display of simulated visual glide path indicators 120 substantially coincides with the real-time position of the aircraft.

According to one embodiment of the invention, the on- and off-course information may also be interrogated at appropriate intervals and used to respectively enable and disable the simulated visual glide path indicator 120 so that SA is not compromised by misleading information.

Figure 8:
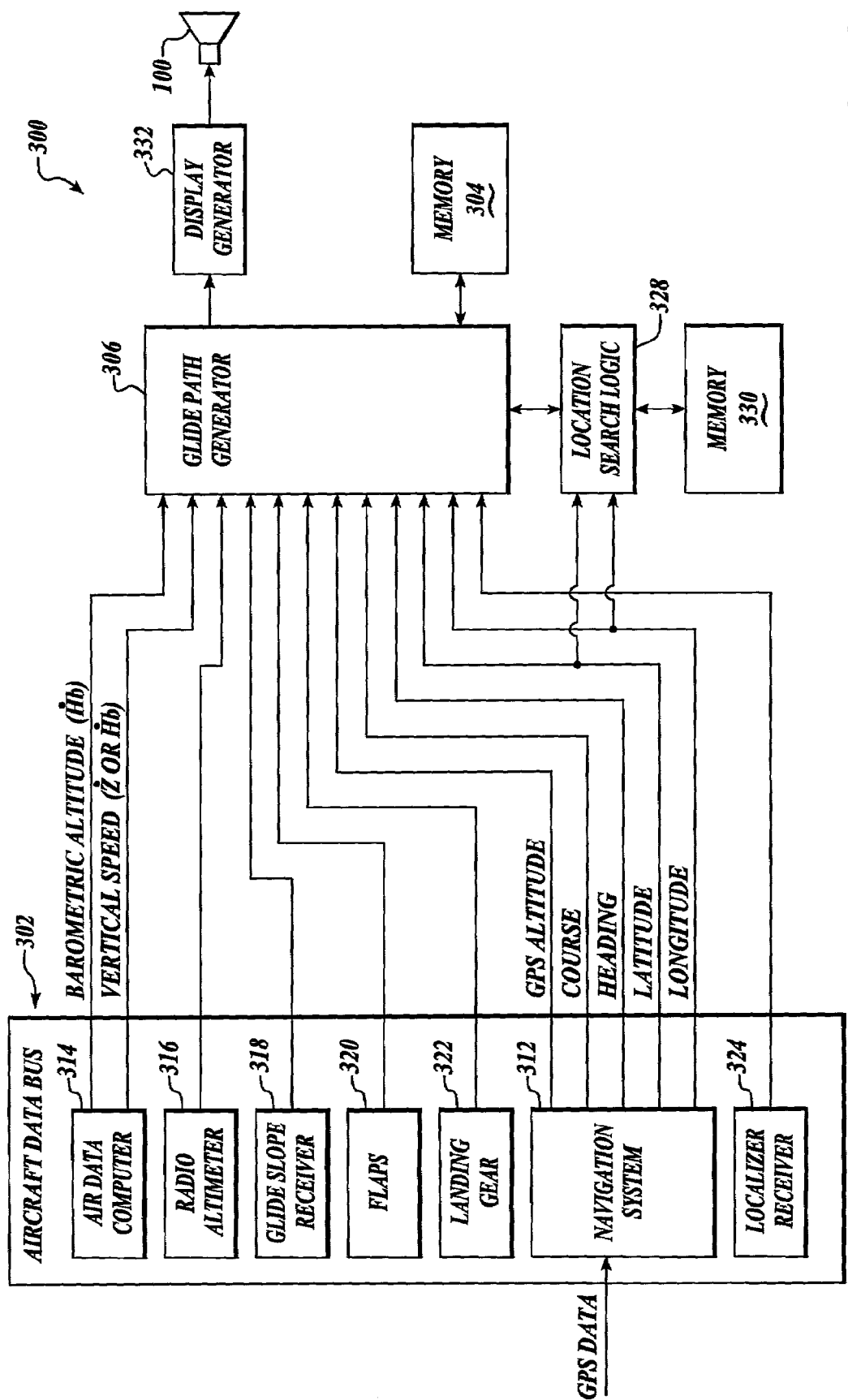
FIG. 8 illustrates one example of a simulated visual glideslope indicator system of the invention embodied in an aircraft environment.

FIG. 8 illustrates one example of a simulated visual glide path indicator system 300 of the invention embodied in an aircraft environment. Accordingly, various signals are provided to the simulated visual glide path indicator system 300 of the invention for generating and displaying the simulated visual glide path indicators 120, 120a and 120b exemplified in FIG. 6. For example, either an aircraft data bus 302 or another suitable means for providing real-time electronic signal data provides the various signals to the simulated visual glide path indicator system 300 for generating and displaying the simulated visual glide path indicators 120, 120a, 120b. A detailed description of the signals available on an aircraft data bus 302 is provided by the ARINC Characteristic 429 as published by Aeronautical Radio, Incorporated of Annapolis, Md., which is incorporated in its entirety herein by reference. Included in the signals provided by the aircraft data bus 302 or other suitable source are: barometric and radio altitude signals; a vertical speed signal; navigation signals including course, heading, latitude and longitude signals; a radio glideslope signal; flap and gear position signals; and localizer receiver signals. These signals are used as inputs to a simulated glide path circuit, which in turn is effective to generate a simulated visual glide path signal whenever the various flight parameters indicate that the aircraft is on an approach. The simulated visual glide path signal is applied to a display generator, that in turn generates a simulated visual glide path indicator signal that results in simulated visual glide path indicators 120 being displayed on the display 100.

For example, the simulated visual glideslope system 300 as embodied in FIG. 8 includes a plurality of machine instructions stored in an onboard memory 304, which are retrieved and operated by a processor 306 to generate the simulated visual glide path indicators 120. The processor 306 uses data received from a navigation system 312 on the aircraft to provide current information about the altitude, course, heading, latitude and longitude of the aircraft. The navigation data may be obtained directly from the navigation system, which may include an inertial navigation system, a satellite navigation receiver such as a GPS receiver, VLF/OMEGA, Loran C, VOR/DME or DME/DME, or from a flight management system (FMS).

Information about the barometric altitude of the aircraft and the vertical speed of the aircraft are available from the navigation system 312, from an air data computer 314, or from a barometric altimeter and a barometric rate circuit present on the aircraft. The vertical speed may be expressed as a barometric rate, or as Z velocity, which may be obtained from an onboard inertial navigation system. Alternatively, the simulated visual glide path indicator system 300 utilizes altitude signals from a radio altimeter 316. The altitude signals are optionally geometric altitude signals generated by the computer processor 306 as a blended combination of the instantaneous GPS altitude signal and the barometric altitude signal as described by Johnson et al. in U.S. Pat. No. 6,216,064, entitled Method and Apparatus for Determining Altitude, which is incorporated in its entirety herein by reference and is owned by the assignee of the present application. Methods and apparatus for determining altitude, specifically altitude in an aircraft, and an estimated error of the altitude are described in U.S. Pat. No. 6,216,064. The altitude determination preferably uses a first altitude based on hydrostatic calculations, including local pressure and temperature, as well as a second altitude which is preferably a GPS altitude. A radio altimetry can also be used instead of or to complement the GPS altitude. Other sources of altitude determination can be used in the equation for the calculation of the final altitude. Each of the sources of altitude determination is provided with a complementary estimated error. In the final determination of the probable altitude, each source of altitude information is preferably accorded a weighting according to the estimated error of the altitude source. For global positioning altitude, the final combination of the altitude sources uses a complementary filter which takes into account the selective availability of the GPS altitude. This accounts for the long-term accuracy but short-term inaccuracy of GPS altitude. Corrections are provided to account for horizontal changes in pressure gradient as the aircraft moves from an origin to a destination. The invention described in U.S. Pat. No. 6,216,064 further provides for the altitude to be corrected based on non-standard atmospheric temperature (ISA) variations. In operating the method of U.S. Pat. No. 6,216,064, the computer processor 306 and memory 304 are configured to receive the altitude information and make the necessary calculations to result in an estimate of the current altitude which is then made available to the simulated visual glide path indicator system 300 of the invention. The computer processor 306 includes inputs to receive sources of altitude information.

A signal from a glide slope receiver 318 may be used to indicate whether an ILS is available to provide a glide slope radio signal. Discrete signals from discretes 320 and 322 indicate the position of the flaps and landing gear, which indicate whether the aircraft is configured for landing. Also used are signals from a localizer receiver 324, which indicates whether the aircraft is on the correct course for a landing.

The signals from the glide slope receiver 318, and the flap and landing gear discretes 320 and 322 are applied to the processor 306 for enabling the simulated visual glide path indicators 120, 120a. When a request for the simulated visual glide path indicators 120, 120a, 120b is received, the signals from the glide slope receiver 318, and the flap and landing gear discretes 320 and 322 may be interrogated to determine whether an ILS system is available at the target runway and whether the aircraft is configured for landing. The signals from the localizer receiver 324 may be interrogated to determine whether the aircraft is aligned with the runway. Such information are optionally used to disable the simulated visual glideslope indicators 120, 120a, 120b.

The request stimulates the simulated visual glide path indicator generator operated by the processor 306 to request airport and runway information from a location search logic circuit 328. The location search logic 328 uses either the latitude and longitude data supplied by the navigation system 312 (shown) or information from the flight plan stored in the onboard FMS to access a data base of airport and runway information stored in an onboard memory 330.

The request also stimulates the processor 306 to operate an algorithm for generating the simulated visual glide path indicators 120, including the ideal glide path target 120*a* and the needle or pointer 120*b*, illustrated in FIG. 6. Using the altitude, latitude and longitude data supplied by the navigation system 312, the glide path generator is operated by the processor 306 to determine a physical relationship of the aircraft to the target runway. The current relationship is compared with either a stored set of relationship data or with subsequent relationship data to compute an accurate speed over the ground, a vertical speed, a course and a heading, unless these information are otherwise available, e.g., from the air data computer 314 and navigation system 312. The glide path generator either computes an acceptable glide path to the target runway that includes acceptable deviations from an ideal glide path, or retrieves a predetermined glide path from the database stored in the memory 330 via the search logic 328 as a function of the position of the aircraft as supplied by the navigation system 312. The computed or retrieved glide path may optional include modifications for local obstacles to flight and elevated terrain that affect the approach to the airport, if such information are available.

The glide path generator compares the computed relationship of the aircraft to the target runway with the computed ideal glide path to determine coincidence and computes the degree and direction of any deviation from the ideal. The comparison is used by the processor 306 to generate display signals that indicate the coincidence or the degree and direction of deviation from the ideal glide slope. The display signals are output to a display generator 332 that interprets the display signal to generate the simulated visual glide path indicators 120 on the display 100 in a fashion that mimics a VASI or PAPI system or another airport lighting aid appropriate for the target runway. Thus, the display generator 332 interprets the display signal to generate a pattern of lights 120 on the display 100 such that, when the aircraft is on the computed glide path, red colored lights are illuminated over white colored lights. Above the computed glide path, white colored lights are illuminated over other white colored lights, and below the computed glide path red colored lights are illuminated over other red colored lights.

Furthermore, the display generator 332 interprets the display signal to generate color transition between visible lights 120 such that, as illustrated in FIG. 6, the second light from the bottom is colored pink (shown shaded) to indicate the slightly below path condition. Similarly, though not shown, the second light from the top may be shown colored pink to indicate a slightly above path condition.

Additionally, the display generator 332 interprets the display signal to generate the visual ideal glide path target 120*a* between the upper and lower visible lights 120 such that, as illustrated in FIG. 6, the target 120*a* provides a visual target for the pilot to acquire and maintain during approach.

The display generator 332 also interprets the display signal to generate the needle pointer 120*b*, as shown in FIG. 6, for simulating a traditional vertical deviation scale. The simulated visual glide path indicator needle 120*b* indicates the vertical position of the aircraft relative to the ideal glide path, and thereby provides additional visual information as to the degree of deviation from the computed ideal glide path.

According to one embodiment of the invention, the simulated visual glide path indicators 120, including the ideal glide path target 120*a* and the needle or pointer 120*b* are displayed on the display 100, which is embodied as a liquid crystal display (LCD). When the display 100 is embodied as a color LCD, the simulated visual glide path indicators 120 are displayed as described above. However, when the display 100 is embodied as a black and white LCD, the simulated visual glide path indicators 120 are displayed in shades of gray, for example, as illustrated in FIG. 6.

According to another embodiment of the invention, using light sources, for example, light emitting diodes (LED) or other suitable light sources, simulated visual glide path indicators 120 are displayed on the display 100.

According to a conformal display embodiment of the invention, the simulated visual glide path indicators 120 are displayed at approximately the position where ground-based VASI, if available, would be visible from the cockpit. The glide path indicators thus conform to the runway as viewed from the aircraft's cockpit. According to an alternative embodiment of the invention, the simulated visual glide path indicators 120 are displayed at fixed locations on the display 100. The indicators 120 thus remain stationary relative to the display 100, while other aspects of the display may change as the aircraft approaches more closely to the runway.

The simulated visual glide path indicators 120 of the invention thus provide the pilot additional color coding information consistent with what would be seen during a VMC approach if airport lighting aids were available and visible. The symbology of the simulated visual glide path indicators 120, 120*a*, 120*b* facilitates basic, simple, perceptual judgements. The color coding provides pre-attentive context that informs the pilot whether the aircraft is high or low, the pilot then further interrogates the display, i.e., visually determines the displacement from center of the needle pointer 120*b*, to determine degree of corrective action required to acquire or reacquire track. The pre-attentive information that the pointer and color-coding provides shortens pilot response time. The presentation of the simulated visual glide path indicators 120, 120*a*, 120*b* also aids Instrument Flight Rules approaches when integrated into the normal Instrument Landing System (ILS) glideslope display on the display 100.

According to one embodiment of the invention, the processor 306 is equipped with minimum confidence thresholds for the position and altitude data such that the simulated visual glide path indicators 120, 120*a*, 120*b* may be disabled when the available information is insufficient to calculate a valid approach glide path.

According to another embodiment of the invention, the simulated visual glide path indicators 120, 120*a*, 120*b* on the display 100 are optionally disabled when a ground-based runway visual aid is available to avoid correlation problems.

In addition to being practiced as apparatus and methods, the present invention is also practiced as a computer program product for indicating deviation from a glide path. The computer program product of the invention includes a computer-readable storage medium having computer-readable program code means embodied in the medium. With reference to FIG. 8, the computer-readable storage medium may be part of the memory device 304, and the processor 306 of the present invention implements the computer-readable program code means to determine deviation from a glide path and generate a signal representative of the amount or degree of deviation.

The computer-readable program code means includes a first computer-readable program code means for determining a global position from a received plurality of navigation data; a second computer-readable program code means for determining an altitude above ground level from one or more received navigation datum; a third computer-readable program code means for retrieving a plurality of airport information from a database of airport information as a function of the position determined from the first computer-readable program code means; a fourth computer-readable program code means for determining coincidence between the position determined from the first computer-readable program code means combined with the altitude determined from the second computer-readable program code means and a glide path determined as a function of the airport information determined from the first computer-readable program code means; and a fifth computer-readable program code means for outputting a signal as a function of the coincidence determined from the fourth computer-readable program code means.

With reference to the fourth computer-readable program code means, as discussed previously with respect to the various apparatus and methods of the present invention, the fourth computer-readable program code means, that for determining coincidence between the position combined with the altitude and the glide path, may include means for computing the glide path as a function of the airport information. Alternatively, the fourth computer-readable program code means may include computer-readable program code means for retrieving the glide path as one of the plurality of airport information retrieved from the database of airport information stored in the memory 330.

As discussed previously with respect to the various apparatus and methods of the present invention, the computer program product may further include a sixth computer-readable program code means for interpreting the signal output by the fifth computer-readable program code means as a pattern of illuminated indicators on a cockpit display such as the display 100. For example, the sixth computer-readable program code means may interpret the signal output by the fifth computer-readable program code means as a pattern of illuminated indicators 120 that simulate on a cockpit display a known airport lighting aid, such as a simulated VASI or PAPI airport lighting aid. The sixth computer-readable program code means may further interpret the signal output by the fifth computer-readable program code means as a pattern of illuminated indicators 120 that is presented on the display 100 substantially conformally with the ground as viewed from the cockpit of the host aircraft.

According to another embodiment of the computer program product of the invention, a seventh computer-readable program code means may further interpret the signal output by the fifth computer-readable program code means as a needle or pointer indicator 120b for simulating on the display 100 the traditional vertical deviation scale, and thereby provide additional information as to the degree of deviation.

While the preferred embodiment of the invention has been illustrated and described, it will be appreciated that various changes can be made therein without departing from the spirit and scope of the invention.

What is claimed is:

1. An airport lighting aid simulation generator, comprising:
    a means for receiving position and altitude signals;
    a means for determining position and altitude information from the position and altitude signals;
    a means for retrieving runway position and direction information from a database of airport information as a function of the position and altitude signals;
    a means for determining a glide path as a function of the runway position and direction information retrieved from the database;
    a means for determining deviation from the glide path as a function of comparing the position and altitude information with the glide path;
    a means for outputting a signal representative of the deviation from the glide path; and
    a means for interpreting the signal output by the means for outputting as a pattern of illuminated indicators on a cockpit display, wherein the pattern of illuminated indicators simulates a known airport lighting aid.

2. The generator of claim 1, further comprising a means for visually displaying the deviation from the glide path as a function of the deviation signal.

3. The generator of claim 2 wherein the displaying means further comprises means for displaying the deviation as a pattern of color coded indicators.

4. The generator of claim 2 wherein the displaying means further comprises means for displaying information as to a degree of deviation from the glide path as a visual image relative to the pattern of color coded indicators.

5. The generator of claim 1 wherein the means for determining a glide path further comprises means for generating the glide path as a combination of the runway position and direction with the position and altitude information.

6. The generator of claim 1 wherein the means for determining a glide path further comprises means for retrieving the glide path from the database.

7. The generator of claim 1 wherein the means for determining deviation from the glide path further comprises a means for determining deviation from the glide path as a function of comparing the position and altitude information with the glide path exclusive of an Instrument Landing System (ILS) signal.

8. A simulated airport lighting aid generator, comprising:
    an on-board processor structured to receive a plurality of navigation signals representative of a position and an altitude of a host aircraft;
    an on-board signal generator operated by the processor, the generator being structured to retrieve airport glide path information from a database of stored airport glide path information as a function of the position signal, and output signal representative of a degree of coincidence with the glide path as a function of comparing the position and altitude signals with the glide path information; and
    an on-board display structured to receive the signal output by the signal generator and responsively output a visual indication of the degree of coincidence with the glide path, wherein a pattern of illuminated indicators are positioned simulating a known airport lighting aid.

9. The generator of claim 8 wherein the pattern of illuminated indicators are positioned on the display to appear in positions consistent with ground-based airport lighting aids as seen on approach.

10. The generator of claim 8 wherein the display further comprises:
    an illuminated degree of deviation indicator indicating a degree of deviation from coincidence with the glide path, the illuminated degree of deviation indicator being positioned relative to the pattern of illuminated indicators simulating a known airport lighting aid.

11. The generator of claim 8 wherein the signal generator is further structured to output signals representative of a lateral deviation scale relative to the runway; and the display is further structured to responsively output a visual indication of the lateral deviation scale.

12. The generator of claim 8 wherein the signal generator is further structured to output signals representative of horizontal and longitudinal perspective line segments in positions relative to ground as a function of the airport information and the position and altitude of the host aircraft; and the display is further structured to responsively output a visual indication of the horizontal and longitudinal perspective line segments in positions constructed to appear conformal to a flat surface on the ground.

13. The generator of claim 8 wherein the signal generator is further structured to output signals representative of a path to a current waypoint and a next waypoint; and the display is further structured to responsively output a visual indication of the path to the current and next waypoints.

14. The generator of claim 8 wherein the navigation signals are further exclusive of an Instrument Landing System (ILS) signal.

15. A glide path deviation generator, comprising:

a memory having a stored database of airport information accessible as a function of position, the airport information including runway location, elevation and direction information;

a processor coupled to receive position and elevation data and coupled to the memory for retrieving the airport information as a function of the position, the processor being structured to operate a computer program for generating a glide path, comparing the position and elevation data to the glide path, and generating a signal representative of deviation of the position and elevation data from the glide path; and a cockpit display being coupled to receive the deviation signal and being structured to display a pattern of color coded indicators as a function of the deviation signal, wherein the pattern of indicators further comprises a pattern of indicators that substantially simulates an airport lighting aid.

16. The generator of claim 15 wherein operating a computer program for generating a glide path further comprises operating the computer program as a function of the airport information to compute a glide path.

17. The generator of claim 15 wherein operating a computer program further comprises operating the computer program repeatedly for comparing updated position and elevation data to the glide path, and generating a signal representative of deviation of the updated position and elevation data from the glide path.

18. The generator of claim 15 wherein the airport lighting aid substantially simulated by the pattern of indicators further comprises a simulated Visual Approach Slope Indicator having a pointer portion that is programmed to simulate a vertical deviation scale.

19. A computer program product for indicating deviation from a glide path, wherein the computer program product comprises:

a computer-readable storage medium; and computer-readable program code means embodied in the medium, the computer-readable program code means comprising:

first computer-readable program code means for determining a global position from a received plurality of navigation data;

second computer-readable program code means for determining an altitude above ground level from one or more received navigation datum;

third computer-readable program code means for retrieving a plurality of airport information from a database of airport information as a function of the position determined from the first computer-readable program code means;

fourth computer-readable program code means for determining correspondence between the position determined from the first computer-readable program code means combined with the altitude determined from the second computer-readable program code means and a glide path determined as a function of the airport information determined from the first computer-readable program code means;

fifth computer-readable program code means for outputting a signal as a function of the correspondence determined from the fourth computer-readable program code means; and sixth computer-readable program code means for interpreting the signal output by the fifth computer-readable program code means as a pattern of color coded indicators on a cockpit display, wherein the pattern of display indicators simulates a known airport lighting aid.

20. The computer program product of claim 19 wherein the fourth computer-readable program code means for determining correspondence between the position combined with the altitude and the glide path further comprises means for computing the glide path as a function of the airport information.

21. The computer program product of claim 19 wherein the fourth computer-readable program code means for determining correspondence of the position and altitude with the glide path further comprises computer-readable program code means for retrieving the glide path as one of the plurality of airport information retrieved from the database of airport information.

22. The computer program product of claim 19, wherein the simulated airport lighting aid further comprises a substantially conformal presentation.

23. The computer program product of claim 19, further comprising a seventh computer-readable program code means for interpreting the signal output by the fifth computer-readable program code means as a pointer indicator for simulating a vertical deviation scale on the cockpit display.

24. A method for using an electronic circuit to compare a signal conveying navigation data with a predetermined glide path, the method comprising:

receiving a plurality of navigation signals;

retrieving airport information from a database as a function of one or more of the navigation signals;

determining deviation from a glide path as a function of one or more of comparing the navigation signals and one or more of the airport information;

outputting a signal representative of the deviation from the glide path; and visually displaying the deviation from the glide path as a function of the deviation signal, wherein visually displaying the deviation includes displaying an illuminated indicator indicating the degree of deviation from the glide path positioned relative to a pattern of illuminated indicators simulating a known airport lighting aid.

25. The method of claim 24 wherein displaying the deviation further comprises displaying an airport image as a function of the airport information retrieved from the database; and displaying the deviation as a substantially conformal presentation relative to the airport image.

26. The method of claim 24 wherein displaying the deviation further comprises displaying color coded information as to a degree of deviation.

27. The method of claim 24 wherein determining the deviation from a glide path further comprises computing the glide path as a function of one or more of the airport information.

28. The method of claim 24 wherein determining the deviation from a glide path further comprises retrieving the glide path from the database.

29. The method of claim 24, further comprising updating the deviation over time.

30. The method of claim 29 wherein updating the deviation over time further comprises repeating the determining of the deviation from the glide path at predetermined intervals.

* * * * *